(12) United States Patent
Ikenaka

(10) Patent No.: US 7,636,291 B2
(45) Date of Patent: Dec. 22, 2009

(54) OPTICAL PICKUP APPARATUS

(75) Inventor: Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 461 days.

(21) Appl. No.: 11/713,491

(22) Filed: Mar. 1, 2007

(65) Prior Publication Data

US 2007/0211603 A1    Sep. 13, 2007

(30) Foreign Application Priority Data

Mar. 7, 2006    (JP) .............................. 2006-061077

(51) Int. Cl.
*G11B 7/00* (2006.01)
(52) U.S. Cl. .................. 369/112.08; 369/112.05; 369/112.25
(58) Field of Classification Search ............ 369/112.08, 369/112.05, 112.25
See application file for complete search history.

(56) References Cited

U.S. PATENT DOCUMENTS

2004/0213136 A1* 10/2004 Arai et al. .............. 369/112.23

2005/0111337 A1* 5/2005 Hatano et al. .......... 369/112.16

FOREIGN PATENT DOCUMENTS

JP    2005-209250    8/2005

* cited by examiner

*Primary Examiner*—Joseph H Feild
*Assistant Examiner*—Nicholas Lee
(74) *Attorney, Agent, or Firm*—Cohen Pontani Lieberman & Pavane LLP

(57) ABSTRACT

The present invention provides an optical pickup apparatus including a first light source, a second light source, a third light source, and a light-converging optical system including an objective lens. The objective lens includes at least one optical surface with a diffractive structure. The diffractive structure includes a plurality of ring shaped zones. Each of the ring shaped zones is concentrically arranged around an optical axis and includes a step difference extending along the optical axis. In the objective lens, the predetermined conditions according to the offence against a sine condition, an average of step differences of the plurality of ring shaped zones, a focal length, and a magnification, are satisfied.

3 Claims, 4 Drawing Sheets

OPTICAL PICKUP APPARATUS

This application claims priority from Japanese Patent Application No. 2006-061077 filed Mar. 7, 2006, which is incorporated hereinto by reference.

TECHNICAL FIELD

The present invention relates to an optical pickup apparatus, particularly relates to an optical pickup apparatus which is capable of compatibly recording and/or reproducing information for different optical information recording media.

BACKGROUND

In recent years, there have been rapidly proceeded the research and development for a high-density optical disc system, which is capable of recording and/or reproducing information (hereinafter, "recording and/or reproducing" will be expressed by using following wording "recording/reproducing") by using a blue-violet laser diode having wavelength of about 400 nm. For example, there is provided an optical disc, what is called a "Blu-ray Disc" (hereinafter it will be called BD), used for recording/reproducing information based on the standard that NA (Numerical Aperture) is 0.85 and wavelength of a light source is equal to 405 nm. As for BD, information of 23-27 GB per a layer can be recorded on the optical disc having a diameter of 12 cm, which is the same size as a DVD which is used based on the standard that NA is 0.6 and wavelength of a light source is 650 nm, and whose recording capacity is 4.7 GB. There is also provided an optical disc, what is called a "HD DVD" (hereinafter it will be called HD), used for recording/reproducing information based on the standard that NA (Numerical Aperture) is 0.65 and wavelength of a light source is equal to 405 nm. As for HD, information of 15-20 GB per a layer can be recorded on the optical disc having a diameter of 12 cm. These discs are named "a high density optical disc".

On the other hand, it is sometimes considered that a product, such as an optical disc player and a recorder (hereinafter it will be called an optical disc player/recorder), which is capable of only recording/reproducing information for a high-density optical disc is worthless. Taking account of a fact that, at present, DVDs and CDs (Compact Disc), onto which various kinds of information have been recorded, are on the market, the value of the product as a high-density optical disc player/recorder is increased by, for example, enabling to appropriately record/reproduce information additionally for DVDs and CDs, which users possess. From these backgrounds, the optical pickup apparatus installed in the high-density optical disc player/recorder is required to be capable of appropriately recording/reproducing information not only for a high-density optical disc but also a DVD and a CD.

As a method for appropriately recording/reproducing information for any disc of a high-density optical disc, DVD and further CD while keeping the compatibility, it is feasible that a method of selectively switching the optical systems corresponding to the recording density of discs: the high-density optical disc, the DVD and further the CD, for which information is recorded/reproduced. However, since a plurality of optical systems is required for the method, it is disadvantageous for the minimization of the product and which increases the cost of the product.

So, it is preferable to commonly share the optical system for the high-density optical disc and the optical system for the DVD and CD as much as possible in an optical pickup apparatus having compatibility in order to simplify the structure, to decrease the cost of the optical pickup apparatus and to decrease the number of optical parts structuring the optical pickup apparatus as much as possible. Further, to commonly share the objective lens, which is placed so as to be opposing to the optical disc, has advantages from the viewpoints of simplifying the structure and decreasing the cost of the optical pickup apparatus.

However, when realizing the compatibility in the optical pickup apparatus by applying a common objective lens, it requires an idea for forming a converged light spot whose aberration is well corrected on the information recording medium, because of wavelength difference between the light source wavelengths used for respective optical discs.

An embodiment of the aberration correction is to place a coupling lens, which is shiftable in the optical axis direction, between the light source and the objective lens and to shift the coupling lens in the optical axis direction to change the divergent degree of a light flux entering into the objective lens corresponding to the optical disc to be used. However, in order to shift the coupling lens in the optical axis direction, an actuator for shifting the coupling lens is required. Since in order to secure the setting space and the shifting space of the coupling lens, there is a problem that the size of the optical pickup apparatus becomes large and the cost increases. In the case of that a liquid crystal display is inserted between the light source and the objective lens, the same problem that the cost increases, occurs.

With respect to anther embodiment of the aberration correction, the following idea is proposed in order to realize the compatibility. A diffractive structure with wavelength selectability is provided on the optical surface of the objective lens to generate diffracted light fluxes with different orders corresponding to the three types of light fluxes passing through the objective lens. According to the structure, since the coupling lens is placed stably, the actuator is not necessary. However, there is a problem that the diffractive structure for generating the diffracted light fluxes with different orders lowers the light utilization factor of the specific type of light flux.

Japanese Patent Application Open to Public Inspection (JP-A) 2005-209250 disclosed the method for realizing the compatibility across the three types of different optical discs by differentiating the image magnification when using a high-density optical disc, the image magnification when using a DVD, and the image magnification when using a CD.

However, according to the technologies disclosed in JP-A 2005-209250, since a finite converging light flux enters the objective lens when using a high density optical disc, the tracking characteristics of the optical pickup apparatus becomes worse and there is a possibility that reading errors occur when the amount of tracking shift is large. Accordingly, the tracking characteristics need to be improved. However, when trying to improve the tracking characteristics, the amount of the offence against the sine condition is hard to be suppressed. Particularly, when shortening the focal length of the objective lens and guiding a finite light flux into the objective lens in order to make the optical pickup apparatus thin, there is a tendency that coma aberration when tracking tends to notably occur.

SUMMARY

It is therefore an object of the present invention is to provide an optical pickup apparatus, which is capable of compatibly recording and/or reproducing information for different optical discs while improving tracking characteristics, appropriately suppressing the amount of the offence against the sine condition and thereby making the optical pickup apparatus thin, in order to solve the problems associated with the prior art.

An embodiment of the present invention is an optical pickup apparatus including a first light source, a second light source, a third light source, a light-converging optical system including an objective lens. The light-converging optical system is adopted to converge a light flux from the first light source onto an information recording surface of the first optical information recording medium to record and/or reproduce information for the first optical information recording medium. The light-converging optical system is adopted to converge a light flux from the second light source onto an information recording surface of the second optical information recording medium to record and/or reproduce information for the second optical information recording medium. The light-converging optical system is further adopted to converge a light flux from the third light source onto an information recording surface of the third optical information recording medium to record and/or reproduce information for a third optical information recording medium. The objective lens includes at least one optical surface with a diffractive structure. The diffractive structure includes a plurality of ring shaped zones each of which is concentrically arranged around an optical axis and includes a step difference extending along the optical axis. The objective lens of the optical pickup apparatus satisfies the predetermined conditions according to the offence against a sine condition, an average of step differences of the plurality of ring shaped zones, a focal length, and a magnification.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 2A:
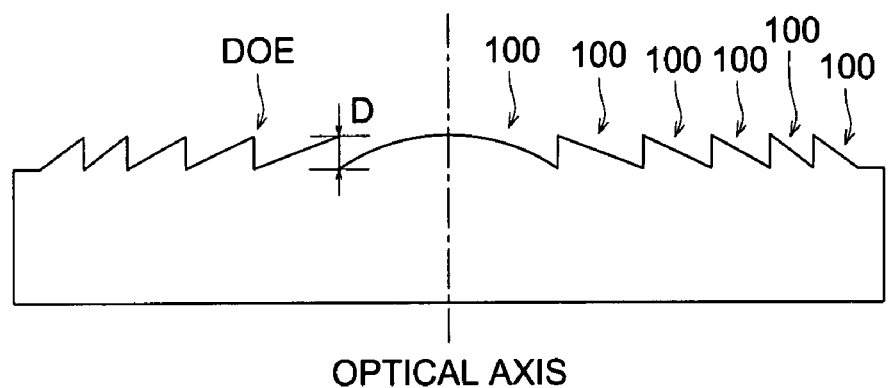
Figure 2B:
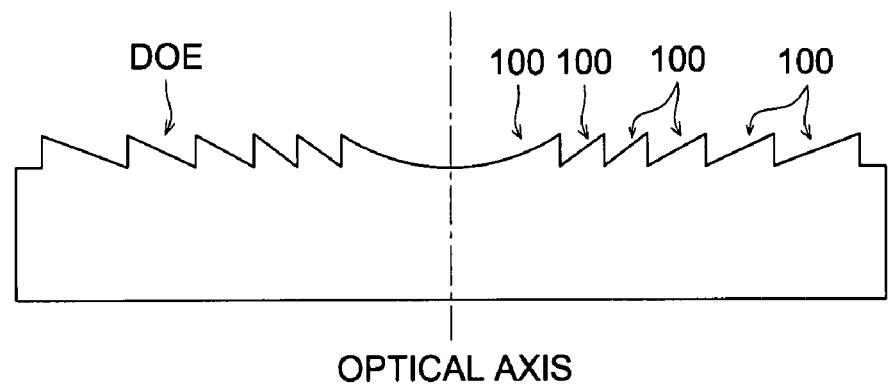
Figure 3A:
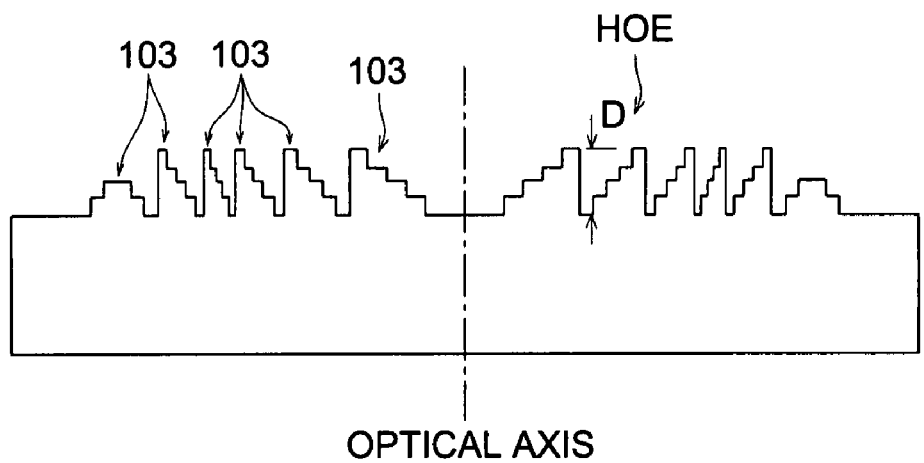
Figure 3B:
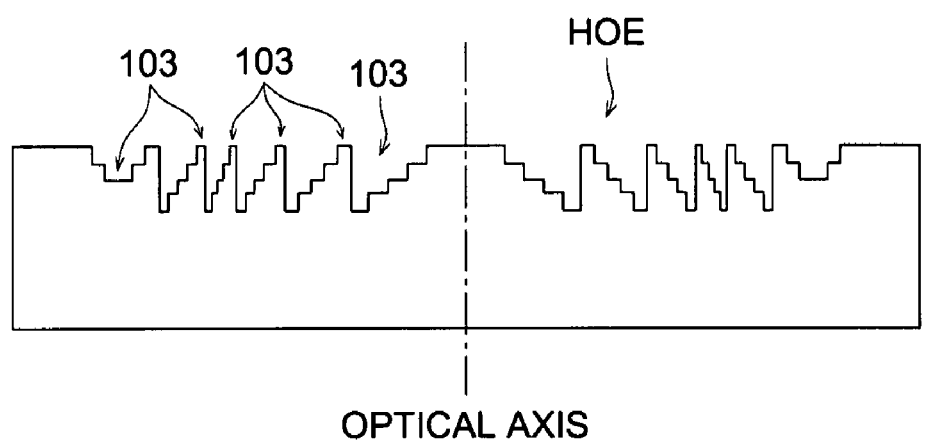
Figure 4:
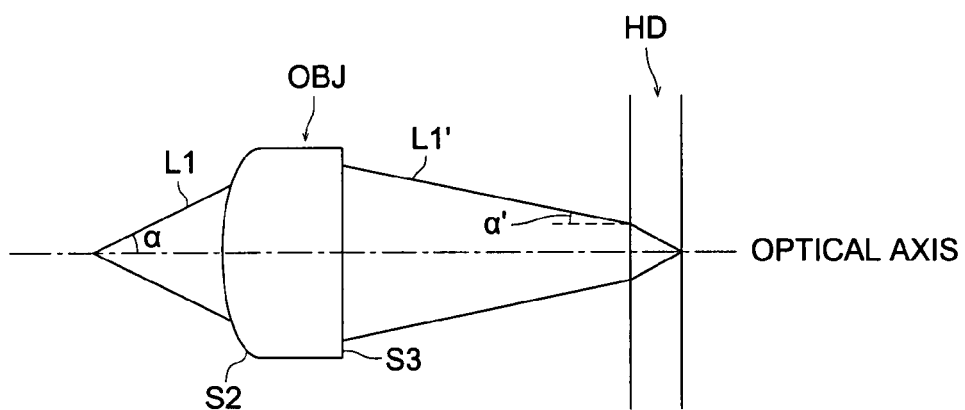

Each of FIGS. 2(a) and 2(b) is a cross sectional view showing an example of the diffractive structure;

Each if FIGS. 3(a) and 3(b) is a cross sectional view showing an example of the diffractive structure; and FIG. 4 is a cross sectional view showing an example of the objective lens OBJ of the embodiment.

DESCRIPTION ON THE PREFERRED EMBODIMENT

Preferred embodiments of the present invention will be described hereinafter.

One of the embodiments of the present invention is an optical pickup apparatus for recording and/or reproducing information for a first optical information recording medium having a first protective layer with a thickness t1, for recording and/or reproducing information for a second optical information recording medium having a second protective layer with a thickness t2 ($0.9 \times t1 < t2 < 1.1 \times t1$), and for recording and/or reproducing information for a third optical information recording medium having a third protective layer with a thickness t3 ($t1 < t3$ and $t2 < t3$). The optical pickup apparatus includes: a first light source for emitting a first light flux with a wavelength $\lambda 1$ (nm); a second light source for emitting a second light flux with a wavelength $\lambda 2$ (nm) satisfying $\lambda 1 < \lambda 2$; a third light source for emitting a third light flux with a wavelength $\lambda 3$ (nm) satisfying $\lambda 2 < \lambda 3$ and $1.9 \times \lambda 1 < \lambda 3 < 2.1 \times \lambda 1$; a light-converging optical system including an objective lens. The light-converging optical system is adopted to converge the first light flux onto an information recording surface of the first optical information recording medium through the first protective layer, to converge the second light flux onto an information recording surface of the second optical information recording medium through the second protective layer, and to converge the third light flux onto an information recording surface of the third optical information recording medium through the third protective layer. The optical pickup apparatus further includes a diffractive structure arranged on at least one optical surface of the objective lens and including a plurality of ring shaped zones. Each of the plurality of ring shaped zones is concentrically arranged around an optical axis and includes a step difference extending along the optical axis. In the optical pickup apparatus, the objective lens has the offence against the sine condition whose amount is represented by $\Delta L = (\sin \alpha / \sin \alpha' - m1)$ when the objective lens receives the first light flux in which a ray entering into an outermost area of an effective aperture of the objective lens forms an incident angle $\alpha$ to the optical axis and when the objective lens emits the first light flux in which a ray emitted from the outermost area of the effective aperture of the objective lens forms an emitting angle $\alpha'$ to the optical axis. The amount of the offence against the sine condition $\Delta L$ satisfies the following conditional expression (1). An average of step differences of the plurality of ring shaped zones is represented by d, which satisfies the following conditional expression (2). The optical pickup apparatus satisfies the following expressions (3) to (5).

$$-0.03 \leq \Delta L \leq 0.03 \quad (1)$$

$$\lambda 1 \times 2/(n1-1) \times 1.0 \leq d \leq \lambda 1 \times 2/(n1-1) \times 1.5 \quad (2)$$

$$0.007 \leq m1 \leq 0.05 \quad (3)$$

$$2.7 \text{ mm} \leq f1 < 3.5 \text{ mm} \quad (4)$$

$$-0.05 \leq m2 - m1 \leq -0.015 \quad (5)$$

Where, $\Delta L$ is the amount of the offence against the sine condition of the objective lens, d is an average of step differences of the plurality of ring shaped zones, m1 is a magnification of the objective lens for recording and reproducing information for the first optical information recording medium, f1 is a focal length of the objective lens for recording and reproducing information for the first optical information recording medium, m2 is a magnification of the objective lens for recording and reproducing information for the second optical information recording medium, and n1 is a refractive index of a medium which forms the diffractive structure, for a light flux with the wavelength $\lambda 1$.

In the present embodiment, a magnification m3 of the objective lens for recording and reproducing information for the third optical information recording medium preferably satisfy $m3 < 0$.

It is further preferable that the optical pickup apparatus of the embodiment satisfies the following conditional expression (2').

$$\lambda 1 \times 2/(n1-1) \times 1.0 \leq d \leq \lambda 1 \times 2/(n1-1) \times 1.3 \qquad (2')$$

Here, for example, the light flux used for recording/reproducing information for the first information recording medium, such as HD, is blue-violet light flux having wavelength about $\lambda 1=407$ nm and the light flux used for recording/reproducing information for the third information recording medium, such as CD, is infrared light flux having wavelength about $\lambda 3=785$ nm. The wavelength $\lambda 3=785$ nm is substantially multiple of the wavelength $\lambda 1=407$ nm. Accordingly, when the light fluxes with these wavelengths pass through the same diffractive structure, the same diffraction effect is expected. So it is difficult to realize the compatibility by providing just the diffractive structure under the condition of the high diffraction efficiency. Then, the embodiment of the present invention realizes the compatibility between the first optical information medium and the second optical information media by differentiating the optical magnifications and by using the diffractive structure. Further, the embodiment of the present invention realizes the compatibility between the first optical information medium and the third optical information media by differentiating the optical magnifications.

The present invention will be further concretely described below. For example, in type optical pickup apparatus called the half-height type, the focal length f1 of the objective lens for the wavelength $\lambda 1$ is sometimes required to satisfy the expression (4). At this time, in order to correct spherical aberration by providing different optical magnifications for the first and third information recording media when forming an image on each of information recording surfaces of the first and third optical information recording media by using the same objective lens, it requires to increase a difference relatively greatly between the incident angle of the light flux having wavelength $\lambda 1$ entering to the objective lens and the incident angle of the light flux having wavelength $\lambda 3$ entering to the objective lens.

Here, in order to keep the tracking characteristics in a good condition, it is intrinsically preferable to guide the light flux having wavelength $\lambda 1$, which is the shortest wavelength, to the objective lens under the condition of an infinite parallel light flux. However, in this case, the light flux having wavelength $\lambda 3$ has to be guided to the objective lens with a large divergent angle. Therefore, it is difficult to keep the tracking characteristics for CD in a good condition. Then, in this embodiment, the divergent angle of the light flux having wavelength $\lambda 3$ is regulated and the tracking characteristic is kept in a good condition by guiding the light flux wavelength $\lambda 1$ to the objective lens with the light flux wavelength $\lambda 1$ being a finite converging light flux enough to satisfy the expression (3). On the other hand, when guiding the light flux having wavelength $\lambda 1$ to the objective lens under the condition of a finite converging light flux, there is a possibility that the tracking characteristics for the high density optical disc become worse. Accordingly, the tracking characteristics for the high density optical disc is kept in a good condition by designing the refractive surface of the objective lens for the light flux having wavelength of $\lambda 1$ so that the amount of the offence against the sine condition $\Delta L$ is kept small within the range of expression (1). In this situation, with respect to the light flux having wavelength $\lambda 3$, the amount of the offence against the sine condition becomes relatively large. However, as described above, by regulating the divergent angle of the light flux having wavelength $\lambda 3$, the tracking characteristic for CD can be maintained at a sufficient degree.

On the hand, the compatibility between the first optical information recording medium and the second optical information recording medium can be realized by differentiating the optical magnifications to each other and by providing a diffractive structure. Therefore, the objective lens of the embodiment can be independently designed for the first and the second optical information recording medium intrinsically. However, when the optical magnification m2 for the light flux having wavelength $\lambda 2$ approaches zero (0), the difference between the optical magnification m2 for the light flux having wavelength $\lambda 2$ and the optical magnification m1 for the light flux having wavelength $\lambda 1$ becomes too large and the amount of offence against the sine condition becomes large. As a result, there is a possibility that the tracking characteristics for DVD become inadequate. Consequently, the optical magnification m2 is set close to the optical magnification m1 so as to satisfy the expression (5) so that the tracking characteristics for DVD can be maintained in a good condition.

Here, the offence against the sine condition is described in detail, referring to FIG. 4. FIG. 4 shows an example of the objective lens of the embodiment. The objective lens receives the light flux with the wavelength $\lambda 1$ (the first light flux) in which a ray entering into an outermost area of an effective aperture of the objective lens forms an incident angle $\alpha$ to the optical axis. The objective lens emits the first light flux in which a ray emitted from the outermost area of the effective aperture of the objective lens forms an emitting angle $\alpha'$ to the optical axis. In this case, the objective lens has an offence against the sine condition by $\Delta L=(\sin \alpha/\sin \alpha'-m1)$.

Here, the diffractive structure in the preferred embodiment is described referring to FIGS. 2(a) to 3(b). Examples of the diffractive structure are: a structure including a plurality of ring-shaped zones 100 and having a cross-sectional form including an optical axis in a serrated shape as schematically shown in FIGS. 2(a) and 2(b), which is diffractive structure DOE; and a structure including a plurality of ring-shaped zones 103 each having a stepwise structure as shown schematically in FIGS. 3(a) and 3(b), which is diffractive structure HOE.

In the meanwhile, each of FIGS. 2(a), 2(b), 3(a) and 3(b) schematically shows an example in which the diffractive structure is formed on a flat surface. However, each diffractive structure may also be formed on a spherical surface or an aspherical surface.

Each of the ring-shaped zones is concentrically arranged around the optical axis and has a step difference extending along the optical axis. The depth of each ring-shaped zone is represented by an amount of step difference D.

When the average amount d of step differences D of the diffractive structure in the optical axis direction is provided to satisfy the expression (2), the diffractive structure generates the second order diffracted light flux with the strongest intensity when the light flux having wavelength $\lambda 1$ passes through the diffractive structure, and the diffractive structure generates the first order diffracted light flux with the strongest intensity when the light flux having wavelength $\lambda 2$ passes through the diffractive structure, and then, the diffractive structure generates the first order diffracted light flux with the strongest intensity when the light flux having wavelength $\lambda 3$ passes through the diffractive structure. Accordingly, by using the diffractive structure, the compatible usage between the first optical information recording medium and the second information recording medium can be realized. The diffractive structure is provided on the optical surface of the objective lens. The diffractive structure may be provided on the optical surface (S2 in FIG. 4) in the light source side or on the optical surface (S3 in FIG. 4) in the optical information recording medium side. Preferably, the diffractive structure should be provided on the optical surface in the light source side. When the diffractive structure is provided on the plurality of optical surfaces of the converging optical system, the diffractive structure on at least one optical surface needs to satisfy the expression (2). In the expression, the average d of the step differences represents an average of the step differences D (an average of the depths) of the ring shaped zones which are arranged within an area on the objective lens where each of the light fluxes with the wavelength λ1, λ2 and λ3 used for recording and/or reproducing information, commonly passes through. In other words, the average d of step differences equals to the value, which can be obtained by dividing the whole sum of all the step differences D of the ring-shaped zones formed within the above described area by the number of the step differences.

In the above embodiment, the optical pickup apparatus preferably satisfies the following conditional expression (6).

$$-1.5 \times 10^{-4} \,°C.^{-1} \leq \Delta n \leq -1.0 \times 10^{-4} \,°C.^{-1} \quad (6)$$

Where, $\Delta n$ (°C.$^{-1}$) is a change amount in a refractive index of the objective lens with a temperature change.

Further, it is said that the spherical aberration generated on the refractive surface is in proportion to the fourth power of focal length. Therefore, the half-height type optical pickup apparatus in which the material is employed satisfying the expression (6), can suppress the spherical aberration due to the temperature change in a good condition without enlarging its manufacturing cost, even when there is provided the objective lens with a focal length satisfying the expression (4) generally utilized for the half-height type optical pickup apparatus. Of course, when the material of the objective lens is glass, spherical aberration can be further suppressed in a small level. In general, when the ambient temperature changes, the oscillation wavelength of a semiconductor laser tends to change. When realizing the compatibility between the first optical information recording medium and the second optical information recording medium by using the diffractive structure, diffraction effect used for realizing a part of the compatibility is caused in the opposite direction to the spherical aberration caused due to the temperature change. Accordingly, regardless of that the optical magnifications are different each other, the temperature dependency of the objective lens can be maintained in good condition. The chromatic aberration CA is set to be 0.15 μm/nm or less to utilize the optical pickup apparatus for recording information. The chromatic aberration means a shift amount of the position where the defocus of the objective lens becomes the best when the wavelength of the light source changes by 1 nm.

In this specification, an objective lens denotes a lens which has a light-conversing function, and which is placed so as to be opposed to an optical information recording medium at the closest position to the optical information recording medium under the condition that the optical information recording medium is installed into the optical pickup apparatus. Alternatively, an objective lens denotes a group of optical elements including the objective lens which is denoted above; and an optical element with light-converging function or a lens, which is attached onto the actuator with the objective lens denoted above to be driven integrally with the objective lens as one body. Namely, an objective lens is preferably a single lens but may be a plurality of lens.

According to the present invention, there is provided an optical pickup apparatus, which is capable of compatibly recording/reproducing information for different optical discs.

Figure 1:
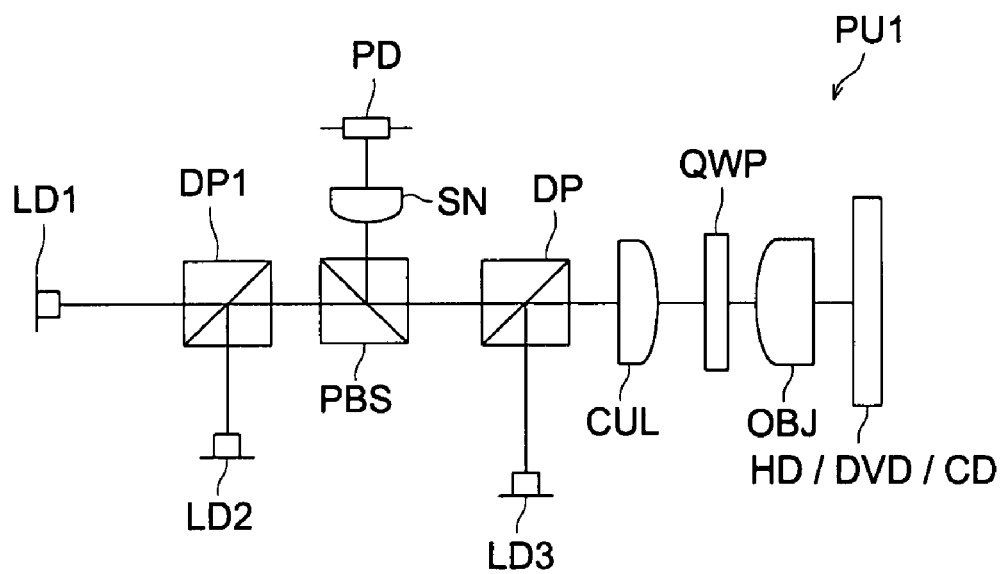
FIG. 1 illustrates a block diagram of the structure for the optical pickup apparatus PU1 of an embodiment of the present invention, which is capable of appropriately recording/reproducing information for different optical information media, such as HD, DVD and CD.

A preferred embodiment of the present invention will be described in detail by using drawings hereinafter. FIG. 1 illustrates a block diagram of the structure for an optical pickup apparatus PU1 of the embodiment, which is capable of appropriately recording/reproducing information for different optical information media (it is also called an optical disc), such as HD, DVD and CD. This optical pickup apparatus PU1 can be installed into an optical information recording/reproducing apparatus.

The optical pickup apparatus PU1 is provided with a first semiconductor laser LD1; a second semiconductor laser LD2; a CD hologram laser LD3; a photo detector PD; a coupling lens CUL; an objective lens OBJ; a first dichroic prism DP1; a polarization beam splitter (it will be called a separation means hereinafter) PBS; a dichroic prism DP (or a half mirror); a λ/4 wavelength plate QWP; and a sensor lens SN. In the optical pickup apparatus PU1, first semiconductor laser LD1 is provided for emitting blue-violet laser light flux (the first light flux) having wavelength of λ1=407 nm which is emitted for recording/reproducing information onto or from a high density optical disc HD. Second semiconductor laser LD2 is provided for emitting red laser light flux (the second light flux) having wavelength of λ2=655 nm which is emitted for recording/reproducing information for DVD. CD hologram laser LD3 includes: a third semiconductor laser for emitting infrared laser light flux (the third light flux) having wavelength of λ3=785 nm emitted for recording/reproducing information onto or from CD; and a photo detector for CD. The third semiconductor laser and the photo detector for CD are unified as one body in the CD hologram laser LD3. Photo detector PD is used commonly for HD and DVD. Coupling lens CUL (it is also called an emission angle conversion element) has an optical surface structured by a refractive surface without having a diffractive structure. Objective lens OBJ has a function for converging the incident laser light flux onto the information recording surface of an optical disc. Sensor lens SN is provided for adding astigmatism to the light flux reflected from the optical disc. A diffractive structure is provided on the optical surface S2 of the objective lens OBJ formed by the resin material, which satisfies the expression (6). The diffractive structure is provided so that the amount of the second order diffracted light flux becomes the strongest when the light flux having wavelength of λ1 passes through the diffractive structure; and that the amount of the first order diffracted light fluxes become the strongest when the light fluxes having wavelengths of λ2 and λ3 pass through the diffractive structure. With respect to the light source for HD, other than the semiconductor laser LD1 described above, a blue-violet SHG laser may be used.

When recording/reproducing information for the HD, in the optical pickup apparatus PU1, the first semiconductor laser LD1 (the first light source) is turned on to emit the laser light flux. Divergent light flux emitted from the first semiconductor laser LD1 passes through the first dichroic prism DP1, the polarization beam splitter PBS and the dichroic prism DP. Then the divergent light flux emitted from the first semiconductor laser LD1 is converted into finite converging light flux with a converging angle θ1 by the coupling lens CUL and passes through the λ/4 wavelength plate QWP. The diameter of the light flux is regulated by a diaphragm (not shown). Then the objective lens forms the light flux into a light spot on the information recording surface through a protective layer of the HD. A biaxial actuator (not shown) provided around the objective lens drives the objective lens to conduct a focusing operation and a tracking operation.

The light flux on HD is reflected and modulated by the information pits on the information recording medium of HD.

The reflected light flux passes back through the objective lens OBJ and the λ/4 wavelength plate QWP, the coupling lens CUL and the dichroic prism DP again. Then the reflected light flux is reflected by the polarized beam splitter PBS. The sensor lens SN gives astigmatism to the reflected light flux. Then the reflected light flux is converged onto the light-receiving surface of the photo detector PD. Therefore, the information recorded on the HD is read out by using the output signal of the photo detector.

When recording/reproducing information for the DVD, in the optical pickup apparatus PU1, the second semiconductor laser LD2 (the second light source) is turned on to emit laser light flux. Divergent light flux is emitted from the second semiconductor laser LD2 and is reflected by the first dichroic prism DP1, and then passes through the polarization beam splitter PBS and the dichroic prism DP. Then the divergent light flux emitted from the second semiconductor laser LD2 is converted into a finite light flux with a converging angle θ2 (θ1≠θ2) or a infinite light flux by the coupling lens CUL and passes through the λ/4 wavelength plate QWP. The diameter of the light flux is regulated by a diaphragm (not shown). Then the objective lens forms the light flux into a light spot on the information recording surface through a protective layer of the DVD. A biaxial actuator (not shown) provided around the objective lens drives the objective lens to conduct a focusing operation and a tracking operation.

The light flux on DVD is reflected and modulated by the information pits on the information recording medium of DVD. The reflected light flux passes back through the objective lens OBJ and the λ/4 wavelength plate QWP, the coupling lens CUL and the dichroic prism DP again. Then the reflected light flux is reflected by the polarized beam splitter PBS. The sensor lens SN gives astigmatism to the reflected light flux. Then the reflected light flux is converged onto the light flux-receiving surface of the photo detector PD. Therefore, the information recorded on the DVD is read out by using the output signal of the photo detector.

When recording/reproducing information for the CD, in the optical pickup apparatus PU1, the third semiconductor laser LD3 (the third light source) is turned on to emit laser light flux. Divergent light flux emitted from the third semiconductor laser LD3 is reflected by the dichroic prism DP. Then the divergent light flux emitted from the third semiconductor laser LD3 is converted into a finite divergent light flux with a divergent angle θ3 by the coupling lens CUL and passes through the λ/4 wavelength plate QWP. The diameter of the light flux is regulated by a diaphragm (not shown). Then the objective lens forms the light flux into a light spot on the information recording surface through a protective layer of the CD. A biaxial actuator (not shown) provided around the objective lens drives the objective lens to conduct a focusing operation and a tracking operation.

The light flux on CD is reflected and modulated by the information pits on the information recording medium of CD. The reflected light flux passes back through the objective lens OBJ and the λ/4 wavelength plate QWP, and the coupling lens CUL again. Then the reflected light flux is further reflected by the dichroic prism DP. Then the reflected light flux is converged onto the light-receiving surface of a photo detector in the hologram laser LD3. Therefore, the information recorded on the CD is read out by using the output signal of the photo detector.

EXAMPLES

A preferable example of the embodiment described above will be described below. Hereinafter (including the lens data in the tables), the power of 10 will be expressed as by using "E". For example, $2.5 \times 10^{-3}$ will be expressed as 2.5E-3.

Each of optical surfaces of the objective lens is formed as an aspherical surface, which has a symmetric shape around the optical axis with defined by substituting the coefficients shown in the tables described later into the expression (10).

$$Z = (y^2/r)/(1+\sqrt{(1-(K+1)(y/r)^2)}) + A_4 y^4 + A_6 y^6 + A_8 y^8 + A_{10} y^{10} + A_{12} y^{12} + A_{14} y^{14} + A_{16} y^{16} + A_{18} y^{18} + A_{20} y^{20} \quad (10)$$

Where Z denotes an aspherical surface shape (the distance along the optical axis from a flat plane contacting with a surface vertex of the aspherical surface), y denotes the distance from the optical axis, r denotes a radius of curvature, K denotes a conic constant and $A_4, A_6, A_8, A_{10}, A_{12}, A_{14}, A_{16}, A_{18}, A_{20}$ denote aspherical surface coefficients.

The diffractive structure provides optical path difference with each of the light fluxes of respective wavelengths, which is defined by substituting the coefficients shown in the tables shown later into the expression (11).

$$\phi = dor \times \lambda / \lambda_B \times (C_2 y^2 + C_4 y^4 + C_6 y^6 + C_8 y^8 + C_{10} y^{10}) \quad (11)$$

Where, $\phi$ denotes an optical path difference function, $\lambda$ denotes a wavelength of the light flux entering to a diffractive structure, $\lambda_B$ denotes a blaze wavelength, dor denotes a diffraction order of the diffracted light flux used for recording and/or reproducing information for an optical disc, y denotes the distance from the optical axis and $C_2, C_4, C_6, C_8, C_{10}$ denote coefficients of the an optical path difference function.

Example 1

The lens data of Example 1 will be shown in Table 1. In the Example 1, the difference between the optical magnification m2 for the wavelength of λ2 and the optical magnification m1 for the wavelength of λ1 is −0.0272, and the amount of the offence against the sine condition ΔL when HD is used is 0 (zero). At this moment, the amount CA of chromatic aberration of the objective lens when HD is used, is −0.30 μm/nm.

The material of the objective lens is polyolefin, which has the amount of change in a refractive index with a temperature change satisfying the expression (6). The Abbe number vd of the material is 56.0.

TABLE 1

| | | Example 1 Objective lens data | | | | | |
|---|---|---|---|---|---|---|---|
| The i-th surface | ri | di (407 nm) | ni (407 nm) | di (655 nm) | ni (655 nm) | di (785 nm) | ni (785 nm) |
| 0 | | −85.00 | | −400 | | 113.59 | |
| 1 (Diameter of diaphragm) | ∞ | 0.0 (φ3.89 mm) | | 0.0 (φ4.24 mm) | | 0.0 (φ3.38 mm) | |
| 2 | 2.0415 | 1.76 | 1.5598 | 1.76 | 1.5407 | 1.76 | 1.5372 |
| 3 | −22.5660 | 1.57 | 1.0 | 1.77 | 1.0 | 1.49 | 1.0 |

TABLE 1-continued

| 4 | ∞ | 0.60 | 1.6187 | 0.60 | 1.5775 | 1.20 | 1.5706 |
| 5 | ∞ | 0.00 | 1.0 | 0.00 | 1.0 | 0.00 | 1.0 |

*di denotes the displacement from the i-th surface to the i-th + 1 surface

The second surface
Aspherical surface coefficient

| κ   | −5.2879E−01 |
| A4  | −1.5300E−04 |
| A6  | 1.1298E−03 |
| A8  | −1.9705E−04 |
| A10 | −5.1839E−05 |
| A12 | 2.1940E−05 |
| A14 | −2.6705E−06 |

The third surface
Aspherical surface coefficient

| κ   | −1.0000E+02 |
| A4  | 1.1330E−02 |
| A6  | −1.6736E−03 |
| A8  | −2.1078E−04 |
| A10 | 6.4809E−05 |
| A12 | −6.0832E−06 |
| A14 | 1.7105E−07 |

Optical path difference function
(HD DVD: 2nd order DVD: 1st order, CD: 1st order)

| λB  | 395 nm |
| C2  | −7.7976E−03 |
| C4  | −9.4692E−04 |
| C6  | 2.8864E−04 |
| C8  | −1.2518E−04 |
| C10 | 1.3989E−05 |

Example 2

The lens data of Example 2 will be shown in Table 2. In the Example 2, the difference between the optical magnification $m_2$ for the wavelength of $\lambda_2$ and the optical magnification $m_1$ for the wavelength of $\lambda_1$ is −0.0272, and the amount of the offence against the sine condition ΔL when HD is used is 0 (zero). At this moment, the amount CA of chromatic aberration of the objective lens when HD is used, is 0.09 μm/nm.

The material of the objective lens is polyolefin, which has the amount of change in a refractive index with a temperature change satisfying the expression (6). The Abbe number vd of the material is 56.0.

TABLE 2

Example 2 Objective lens data

| The i-th surface | ri | di (407 nm) | ni (407 nm) | di (655 nm) | ni (655 nm) | di (785 nm) | ni (785 nm) |
|---|---|---|---|---|---|---|---|
| 0 |  | −85.00 |  | −400 |  | 113.49 |  |
| 1 (Diameter of diaphragm) | ∞ | 0.0 (φ3.89 mm) |  | 0.0 (φ4.18 mm) |  | 0.0 (φ3.38 mm) |  |
| 2 | 1.9871 | 1.76 | 1.5598 | 1.76 | 1.5407 | 1.76 | 1.5372 |
| 3 | −16.9363 | 1.57 | 1.0 | 1.77 | 1.0 | 1.49 | 1.0 |
| 4 | ∞ | 0.60 | 1.6187 | 0.60 | 1.5775 | 1.20 | 1.5706 |
| 5 | ∞ | 0.00 | 1.0 | 0.00 | 1.0 | 0.00 | 1.0 |

*di denotes the displacement from the i-th surface to the i-th + 1 surface

The second surface
Aspherical surface coefficient

| κ   | −5.3500E−01 |
| A4  | −4.8604E−04 |
| A6  | 1.2795E−03 |
| A8  | −1.8270E−04 |
| A10 | −6.3081E−05 |
| A12 | 2.7110E−05 |
| A14 | −3.4927E−06 |

The third surface
Aspherical surface coefficient

| κ   | −8.8687E+01 |
| A4  | 9.1620E−03 |
| A6  | −6.8716E−04 |

TABLE 2-continued

| | |
|---|---|
| A8 | −4.5458E−04 |
| A10 | 9.4967E−05 |
| A12 | −7.1855E−06 |
| A14 | 9.7646E−08 |
| Optical path difference function | |
| (HD DVD: 2nd order DVD: 1st order, CD: 1st order) | |
| λB | 395 nm |
| C2 | −4.6163E−03 |
| C4 | −7.9718E−04 |
| C6 | 3.3469E−04 |
| C8 | −1.2398E−04 |
| C10 | 1.3766E−05 |

The values related to the expressions (1) to (5) of the above examples will be shown in Table 3.

TABLE 3

Characteristics of respective examples

| | Focal length [mm] | | | Optical magnification | | | Chromatic aberration | | |
|---|---|---|---|---|---|---|---|---|---|
| | f1 | f2 | f3 | m1 | m2 | m3 | for HD CA [μm/nm] | ΔL | d[mm] |
| Example 1 | 3.10 | 3.24 | 3.23 | 0.0352 | 0.008 | −0.0292 | 0.30 | 0.00 | 0.00150 |
| Example 2 | 3.10 | 3.24 | 3.23 | 0.0352 | 0.008 | −0.0292 | 0.09 | 0.00 | 0.00150 |

*Image surface side numerical aperture $NA_{HD}$: 0.65 $NA_{DVD}$: 0.65 $NA_{CD}$: 0.51
*Abbe number of material of objective lens vd: 56.0

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical pickup apparatus for recording and/or reproducing information for a first optical information recording medium having a first protective layer with a thickness t1, for recording and/or reproducing information for a second optical information recording medium having a second protective layer with a thickness t2 (0.9×t1<t2<1.1×t1), and for recording and/or reproducing information for a third optical information recording medium having a third protective layer with a thickness t3 (t1<t3 and t2<t3), the optical pickup apparatus comprising:

a first light source for emitting a first light flux with a wavelength λ1 (nm);

a second light source for emitting a second light flux with a wavelength λ2 (nm) satisfying λ1<λ2;

a third light source for emitting a third light flux with a wavelength λ3 (nm) satisfying λ2<λ3 and 1.9×λ1<λ3<2.1×λ1;

a light-converging optical system comprising an objective lens, being adopted to converge the first light flux onto an information recording surface of the first optical information recording medium through the first protective layer, to converge the second light flux onto an information recording surface of the second optical information recording medium through the second protective layer, and to converge the third light flux onto an information recording surface of the third optical information recording medium through the third protective layer; and a diffractive structure arranged on at least one optical surface of the objective lens and including a plurality of ring shaped zones each of which is concentrically arranged around an optical axis and includes a step difference extending along the optical axis, wherein the objective lens has an offence against a sine condition whose amount is represented by ΔL=(sin α/sin α'−m1) when the objective lens receives the first light flux in which a ray entering into an outermost area of an effective aperture of the objective lens forms an incident angle α to the optical axis and when the objective lens emits the first light flux in which a ray emitted from the outermost area of the effective aperture of the objective lens forms an emitting angle α' to the optical axis, and wherein the optical pickup apparatus satisfies following expressions:

−0.03≦αL≦0.03,

λ1×2/(n1−1)×1.0≦d≦λ1×2/(n1−1)×1.5, 0.007≦m1≦0.05, 2.7 mm≦f1≦3.5 mm, and

−0.05≦m2−m1≦−0.015, where ΔL is the amount of the offence against the sine condition of the objective lens, d is an average of step differences of the plurality of ring shaped zones, m1 is a magnification of the objective lens for recording and reproducing information for the first optical information recording medium, f1 is a focal length of the objective lens for recording and reproducing information for the first optical information recording medium, m2 is a magnification of the objective lens for recording and reproducing information for the second optical information recording medium, and n1 is a refractive index of a medium which forms the diffractive structure, for a light flux with the wavelength $\lambda 1$.

2. The optical pickup apparatus of claim 1, satisfying a following expression:

$$-1.5 \times 10^{-4} \, °C.^{-1} \leq \Delta n \leq -1.0 \times 10^{-4} \, °C.^{-1},$$

where $\Delta n$ is an amount of a change in a refractive index of the objective lens with a temperature change.

3. The optical pickup apparatus of claim 1, wherein the average of the step differences d represents an average of the step differences of the ring shaped zones which are arranged within an area on the objective lens where each of the first, second and third light fluxes used for recording and/or reproducing information commonly passes through.

* * * * *